Patented Sept. 21, 1954

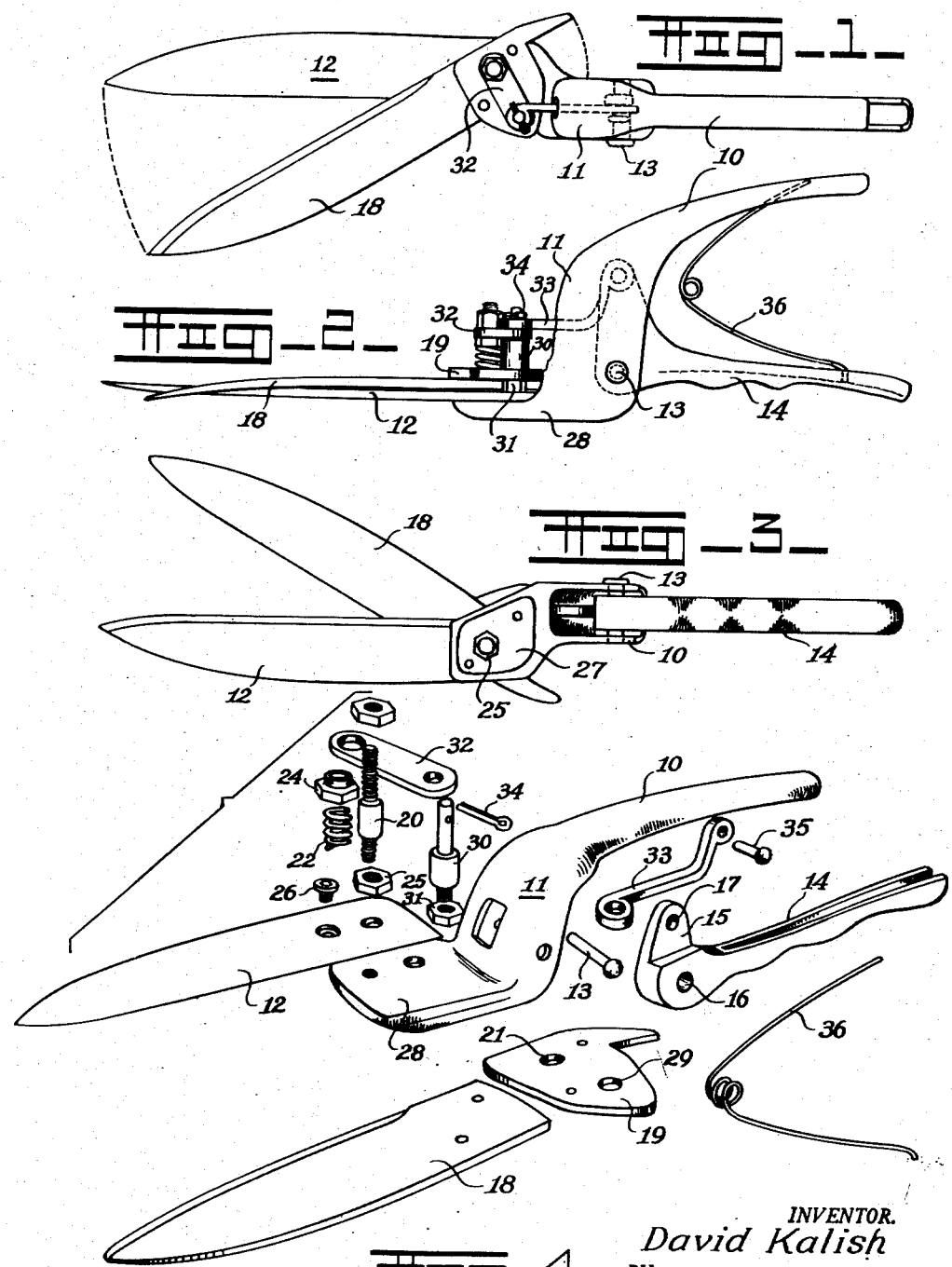

2,689,401

UNITED STATES PATENT OFFICE 2,689,401

GRASS SHEARS HAVING A PIVOTED BLADE AND OFFSET HANDLE

David Kalish, Alliance, Ohio, assignor to The Lewis Engineering and Manufacturing Company, Alliance, Ohio, a corporation of Ohio Application September 14, 1953, Serial No. 380,048

4 Claims. (Cl. 30—248)

This invention relates to improvements in grass shears of the type having a pivoted blade and offset handle.

The principal object of the invention is the provision of a grass shear having an offset fixed blade and a movable blade capable of being moved along a straight line while being operated and whereby a smooth easy efficient cutting action is attained.

A further object of the invention is the provision of an offset shear designed to permit cutting of grass, shrubs and the like closely to walls and other obstructions without skinning the knuckles of the operator.

A still further object of the invention is the provision of an offset grass shear which is very narrow as compared with grass shears heretofore known in the art and of relatively low height enabling the same to be used in narrow locations and stored in a very small space.

A still further object of the invention is the provision of a grass shears which can easily be taken apart for sharpening and readily re-assembled by an unskilled person.

A still further object of the invention is the provision of a grass shears in which a movable blade is pivotally mounted on an offset fixed blade and yieldingly held in engagement thereagainst throughout cutting movement thereof.

The grass shears disclosed herein comprises an improvement in the art as heretofore known and which are generally related to complicated methods and mechanisms of mounting a movable blade on a fixed blade and handle and imparting movement thereto from one of the handles of the shears.

Typical of such prior art shears are those of the Ginnel Patent No. 1,562,630 and Keiser 2,281,977 and 2,407,237. In these patents, as in the other similar shears known in the art, including my copending application S. N. 302,653, which has matured into Patent No. 2,672,684, granted March 23, 1954, shears of the general type are disclosed but without the specific blade mounting and actuating means as disclosed herein which renders the present shears capable of more ready manufacture and at the same time make it much easier to assemble and use.

The principal novelty in the presently disclosed shears is the specific mounting of the movable blade on the fixed blade and handle and the positioning of the means by which the movable handle and the movable blade are operatively connected so that vertical movement of the movable handle imparts horizontal movement to the blade, through a simple post and link connection in longitudinal alignment with the fixed handle of the shears and prevents the sideward tilting of the movable blade which otherwise results.

With the foregoing and other objects in view which will appear as the description proceeeds, the invention resides in the combination and arrangement of parts and in the details of construction hereinafter described and claimed, it being the intention to cover all changes and modifications of the example of the invention herein chosen for purpose of the disclosure, which do not constitute departures from the spirit and scope of the invention.

The invention is illustrated in the accompanying drawing, wherein:

Figure 1 is a top plan view of the shears.

Figure 2 is a side view of the shears.

Figure 3 is a bottom view of the shears.

Figure 4 is an exploded view showing the various parts of the shears in spaced relation to one another.

By referring to Figures 1 and 2 of the drawings it will be seen that the shears comprises a fixed handle 10, the forward end 11 of which is downwardly inclined and apertured and a forward extension thereof supports a fixed blade 12. The downwardly inclined portion 11 of the fixed handle 10 is thickened rearwardly to provide for the location of a transverse pivot pin 13 by means of which the lower movable handle 14 is pivotally mounted on the shears. The lower handle 14 is U-shaped in cross section throughout a majority of its length and has its forward end upturned and offset as at 15. Openings 16 and 17 are formed in this forward end, as best shown in Figure 4 of the drawings. A movable blade 18 having a heel plate 19 affixed to its innermost end is pivotally mounted on the fixed blade 12 by means of a threaded pivot pin 20.

The threaded pivot pin 20 registers in an opening 21 in the heel plate 19 as best seen in Figure 4 of the drawings.

The movable blade 18 is held in desirable movable relation to the fixed blade 12 under appropriate tension by a coil spring 22, positioned between the blade 18 and a nut 24 which are engaged in that order on the threaded pivot pin 20 over the movable blade 18. The fixed blade 12 is mounted on the handle 10 by the threaded pivot pin 20, a nut 25 and a screw 26.

The forward extension of the fixed handle 10 is recessed on its bottom surface as at 27 to receive the nut 25 and provide a supporting surface for the fixed blade 12. This forward end, indicated by the numeral 28, also serves to space the fixed blade 12 with respect to a supporting surface and the same is true with respect to the relative positions of the movable handle 14 and the supporting surface on which the grass shear may be positioned. The movable blade 18 is pivotally mounted on the fixed blade 12 by the threaded pivot pin 20 passing through the opening 21 in the heel plate 19 thereof. The heel plate 19 is secured to the movable blade 18 by suitable fastening means and is in turn provided with an opening 29 in which the lower portion of secondary pivot pin 30 is secured as by a nut 31. The intermediate portion of the secondary pivot pin 30 forms a spacing element between the upper surface of the heel plate 19 and a transverse link 32 which link is apertured at its opposite ends, one of the ends being thereby pivotally secured to the pivot pin 20, and the other end being secured to the secondary pivot pin 30. It will be observed that the pivot pins 20 and 30 are similar in formation, as both include the intermediate spacing portions which act to maintain the link 32 in elevation relation to the fixed and movable blades 12 and 18 respectively.

The secondary pivot pin 30 also receives the forward eyeleted end of a secondary longitudinal link 33. This secondary link 33 is positioned through the large aperture in the inclined forward portion 11 of the fixed handle 10 as best shown in Figs. 1 and 2 and is retained on the secondary pin 30 by a cotter pin 34. The opposite end of the link 33 is upturned and eyeleted and is secured to the forward upturned and offset end 15 of the lower handle 14 by means of a pivot pin 35. It will thus be seen that when the handle 14 is moved toward the fixed handle 10, the link 33 moves forward and thereby pushes the movable blade 18 through the connection of the secondary pivot pin 30.

It will also be seen that the transverse link 32 moving in an arc based on the pivot pin 20 which is fixed in relation to the fixed blade 12 will prevent any tilting motion of the secondary pivot 30, and hence prevent any tilting and rocking motion of the blade 18 to the end that the sole motion imparted the movable blade 18 is that moving the same in a desirable manner based on the pivot pin 20 and thereby achieving the primary object of this invention.

In all grass shears heretofore known in the art, movement imparted a movable blade has either directly tilted or rocked the same or the arrangement for imparting such movement has permitted the undesirable tilting or rocking thereof with the result that the relative positions of the blades of the shears were not uniform.

The present shears includes a spring 36 positioned between the handles 10 and 14 as best shown in Fig. 2 which spring normally urges the handles as well as the blades apart.

It will also be seen that the several parts of the shears herein disclosed are relatively inexpensive, that they are easily replaced if necessary, and that they can be held to close manufacturing tolerances to form a perfectly balanced, easily operated shears while at the same time permitting the blades of the shears to be taken apart and replaced as for sharpening without an involved mechanical operation.

It will thus be seen that the several objects of the invention have been met by the shears disclosed herein.

Having thus described my invention, what I claim is:

1. Shear construction comprising a stationary blade structure including an elongated blade and a stationary handle extending from the rear end thereof, a movable blade, pivot means connecting the rear portions of said elongated blade and said movable blade, said pivot means being disposed intermediate the forward and rearward ends of said blades, secondary pivot means on said movable blade spaced transversely with respect to said first mentioned pivot means, a link interconnecting said first mentioned and secondary pivot means, a movable handle pivoted to said stationary handle, a secondary link pivotly connected to said secondary pivot means, and means on said movable handle cooperating with said secondary link to push said movable blade toward said stationary blade.

2. The shear construction set forth in claim 1 and further characterized by the stationary and movable blades being positioned in offset relation to said handles with said secondary pivot means in longitudinal alignment with said handles.

3. A grass shear comprising upper and lower blades having inner shearing edges, pivot means disposed at the rear end portions of and movably connecting said blades for relative movement thereof in a horizontal plane between open and closed positions, an upper handle extending upwardly and rearwardly from the rear end portion of said lower blade, a lower handle below said upper handle, pivot means connecting said lower handle to said upper handle for relative motion of said handles in vertical planes towards and away from one another, a secondary pivot on said movable blade sidewardly positioned with respect to said pivot means, a transversely positioned link interconnecting said pivot means and said secondary pivot, a secondary link in pivotal engagement with said secondary pivot, and means on said lower handle cooperating with said secondary link to push said upper blade towards said lower blade.

4. In shears a fixed handle having a downwardly inclined forward end section with a fixed blade projecting therefrom in offset relation thereto, a pivot pin on said fixed blade inwardly from the rear end thereof, a movable blade having an apertured heel plate secured thereto pivotly mounted on said pivot pin, said movable blade having a cutting edge registering with the cutting edge of said fixed blade, a secondary pivot pin on said heel plate in transversely spaced relation to said first mentioned pivot pin, a link in pivotal engagement at its ends with said pivot pins, a movable handle pivotly affixed to said fixed handle for movement in a vertical plane towards and away from said fixed handle, and a secondary link in pivotal engagement with said secondary pivot pin and said movable handle to push said secondary pivot pin and said movable blade towards said lower blade.

References Cited in the file of this patent

UNITED STATES PATENTS

| Number | Name | Date |
| --- | --- | --- |
| 21,369 | Roome | Aug. 31, 1858 |
| 25,140 | Roome | Aug. 16, 1859 |
| 910,607 | Sweet et al. | Jan. 26, 1909 |
| 985,048 | Meissner | Feb. 21, 1911 |
| 1,704,313 | Daniel | Mar. 5, 1929 |
| 1,993,546 | Hart et al. | Mar. 5, 1935 |
| 2,503,978 | Vosbikian et al. | Apr. 11, 1950 |
| 2,607,114 | Keiser | Aug. 19, 1952 |